United States Patent [19]

Adams

[11] 4,177,157

[45] Dec. 4, 1979

[54] PRECOAGULATED PTFE-BOUND ELECTRODES

[75] Inventor: Richard L. Adams, Ferndale, Mich.

[73] Assignee: General Motors Corporation, Detroit, Mich.

[21] Appl. No.: 893,695

[22] Filed: Apr. 5, 1978

[51] Int. Cl.$^2$ .................. H01M 4/62; H01M 4/32; H01M 4/52

[52] U.S. Cl. .................. 252/182.1; 252/506; 252/519; 252/513; 429/212; 429/223

[58] Field of Search .................. 252/182.1, 506, 513, 252/519; 427/126, 212, 223

[56] References Cited

U.S. PATENT DOCUMENTS

| | | | |
|---|---|---|---|
| 3,706,601 | 12/1972 | Strier et al. | 429/212 |
| 3,898,099 | 8/1975 | Baker et al. | 429/212 |
| 3,943,006 | 3/1976 | Baker et al. | 252/182.1 |
| 3,967,976 | 7/1976 | Gadessaud et al. | 429/212 |
| 4,000,005 | 12/1976 | McBreen | 429/112 |

Primary Examiner—Richard E. Schafer
Assistant Examiner—Irwin Gluck
Attorney, Agent, or Firm—Lawrence B. Plant

[57] ABSTRACT

Non-sintered PTFE-bound electrodes for alkaline storage batteries are made by coagulating polytetrafluoroethylene (i.e. PTFE) particles from an aqueous dispersion thereof to form a gelatinous coagulum, mechanically dispersing the coagulum in water such that the coagulum is subdivided into small, sticky clots of PTFE particles which are suspended in the water, mixing the suspension with comminuted electrochemically active material to form a slurry of active material and active-material-coated clots, filtering the slurry to separate the solids (i.e. as a filter cake) therefrom, integrating (e.g. sandwiching) an electrically conductive current collector with the filter cake, compressing the thusly formed composite, and drying the compress.

2 Claims, No Drawings

PRECOAGULATED PTFE-BOUND ELECTRODES

BACKGROUND OF THE INVENTION

This invention relates to electrodes for alkaline storage batteries, and more specifically to a water-base process for making such electrodes whereby the electrode active material is held in a non-sintered binder of coagulated polytetrafluoroethylene (hereafter PTFE). The invention is useful for all of the popular alkaline storage battery electrodes (e.g. zinc, cadmium, nickel, silver etc.), but has particular advantage in reducing the weight and cost of nickel electrodes.

One of the major drawbacks to the more extensive use of nickel alkaline batteries (e.g. Ni-Zn) is, for example, the high cost of the nickel electrodes. Originally such electrodes used sintered carbonyl nickel plaque current collector-supports which were impregnated with nickel salts and then converted into nickel hydroxide. Typically this was accomplished by filling the pores of the nickel plaque with an aqueous solution of a nickel salt and subsequently converting the salt to the hydroxide by chemical, electrochemical or thermal processes. The process normally required several repetitions to introduce the desired amount of nickel hydroxide into the plaque and utilized unnecessarily high amounts of nickel which added considerable cost and weight to the electrodes.

More recent electrodes eliminate the plaque and bind the nickel hydroxide in a polymer binder. Some are made by milling (i.e. calendaring) nickel hydroxide, graphite, binder and a plasticizer together and then roll bonding it to a current collecting grid. Various techniques are used to make these electrodes porous. In one technique, a mixture of two immiscible thermoplastic resins is used as an initial binder, one of the resins later leached from the mass with a suitable solvent and the active material retained in a microporous matrix of the remaining insoluble resin. An additional sintering step removes any remaining soluble resin and coalesces the remaining resin.

In another process (i.e. Strier et al. U.S. Pat. No. 3,706,601), an aqueous dispersion of active material particles (i.e. ZnO) is mixed with an aqueous dispersion of a latex type polymer (e.g. PTFE), and a film cast from the mixture, which is then dried and, sintered (e.g. 260° C.-375° C.). The sintered film is then rolled to form a fibrous polymer structure binding the electrode active material together.

McBreen U.S. Pat. No. 4,000,005 discloses a process for making, compressed, non-sintered-binder nickel electrodes by forming a filter cake which is a coagulum of active material particles (i.e. nickel hydroxide, cobalt hydroxide and graphite) entrained in a three dimensional, reticulated, open cell polyvinylidene fluoride (i.e. Kynar) binder which was precipitated slowly out of solution in the presence of the active materials. As the polyvinylidene fluoride slowly precipitates and coagulates it entrains the active materials.

Still other proposed techniques include: (1) precipitating nickel hydroxide as a slurry from a solution of a nickel salt and vacuum impregnating a porous nickel conductor with the slurry; (2) applying a layer of an aqueous paste of nickel hydroxide, nickel powder and a binder to a metallic substrate, compressing it to remove excess water, drying it and compressing it again to achieve intimate nickel hydroxidenickel metal interfacial contact; (3) mixing nickel hydroxide, graphite, dimethylformamide, polyvinylidene fluoride and dimethylacetaminde together, casting it into a thin film (e.g. 0.7-0.8 mm), drying it for a short while, immersing it in water to coagulate the polyvinylidene fluoride, and finally wrapping it with a current collector and fabric separator to form the electrode. Still another technique involves mixing dry powdered PTFE with the active materials in a nonaqueous lubricant to form a slurry, filtering the slurry to form a filter cake containing about 25%-50% lubricant, calendering the filter cake to a self supporting condition, drying it and integrating it with a current collector.

PTFE-bound electrodes are highly resistant to the chemical and electrochemical environment of alkaline cells and, do not lose active material (i.e. graphite and nickel oxide) during formation. Hence they offer advantages over other polymer binders. However they cannot be made by the McBreen process as no acceptable solvent system is known, and even if there were the slow precipitation and cost of materials and the handling thereof in a plant make the McBreen process undesirable on a commercial scale. Moreover the sintered PTFE processes cannot be used with all active materials as the sintering temperatures (i.e. 260° C.-375° C.) tend to destroy the electrochemical activity of some of them notably nickel hydroxide $(Ni(OH)_2)$.

Accordingly objects of the present invention are to provide an inexpensive, water-base process for manufacturing, non-sintered, PTFE-bound electrodes as well as the electrodes themselves. These and other objects of this invention will become more apparent from the description thereof which follows.

BRIEF SUMMARY OF THE INVENTION

The subject invention comprehends coagulating PTFE particles from an aqueous dispersion thereof to form a gelatinous PTFE coagulum, mechanically dispersing the coagulum in water such that the coagulum is subdivided into small, sticky clots of PTFE particles which are suspended in the water, mixing the thusly formed suspension with comminuted electrode active material to form a slurry of active material and PTFE clots coated with active material, filtering the slurry to separate the solids therefrom as a filter cake, integrating an electrically conductive current collector with the filter cake, compressing the thusly-formed collector-cake composite to densify the cake to enhance the electrical contact among and between the active material and the current collector and to interlock the particles together into a coherent mass, and drying the thusly formed compress.

DETAILED DESCRIPTION OF THE INVENTION

In accordance with the present invention, commercially available aqueous dispersions of PTFE particles (e.g., Dupont's "TEFLON" 30B TFE-Fluorocarbon resin) are coagulated to form a gelatinous mass or coagulum of the PTFE. Coagulation may be achieved by any of the known techniques for coagulating PTFE dispersion (i.e. shear forces, PH reduction, organic coagulants etc.) so long as there is sufficient coagulation thereof that there is no substantial loss through the filter medium by uncoagulated PTFE during the filtration step. In accordance with a preferred embodiment of the invention, coagulation of the PTFE dispersion is achieved by adding a small amount of coagulant (i.e.

preferably isopropyl alcohol) thereto to form the initial gelatinous coagulum. Other suitable coagulants would include PH reducing acids, low molecular weight polar alcohols, such as methanol, ethanol, 1-propanol, 2-propanol, 1-butanol, 2-butanol, 1,1,1,-trimethylmethanol, and certain trivalent or tervalent cations such as aluminum or zirconium salt solutions. Only small amounts of coagulant need be added to the concentrated PTFE dispersion to effect substantially complete coagulation and formation of the gelatinous coagulum.

The size of the dispersed PTFE particles (i.e. prior to coagulation) can vary anywhere from a fraction of a micron to several microns in diameter. Successful electrodes have been made from a material known as "Teflon" 30B TFE-Fluorocarbon resin aqueous dispersion. This material is a negatively charged hydrophobic colloid containing about sixty (60) percent by weight PTFE particles (i.e. ranging in size from about 0.05 microns to about 0.5 microns) stabilized with about six percent (i.e. based on weight of PTFE) non-ionic wetting agent.

The gelatinous coagulum is then added to water and rapidly stirred therein to subdivide the coagulum into small clots of PTFE particles and suspend them in the water. These PTFE clots are small, highly irregularly shaped, sticky masses which take on and become coated with active material particles during the mixing/slurrying step. They then become even more irregularly shaped and grow to sufficient size to preclude their passing through or plugging the filter medium during the filtration step.

Comminuted electrode active material is added to the suspension of clots in the blender and intimately mixed therewith to form a slurry. The active material is preferably added dry, but may optionally be preslurried in water and then poured into the blender. During mixing, much of the active material adheres to the surface of the sticky PTFE clots and thereby increases their size. Following thorough mixing of the active material with the PTFE clots and before any significant settling occurs, the thus formed slurry is quickly filtered as by pouring into a mold on a vacuum table with filter paper therebetween and drawing off the water so as to leave the PTFE and active material as a filter cake atop the filter paper. The amount of PTFE needed for binding can vary considerably and depends largely on the composition of the active material, whether or not there are any conductive diluents added to the active material and the electrochemical capacity needed from the electrode. As a general rule, no more PTFE is used than is necessary to effect adequate binding of the active materials into a coherent mass sufficient to withstand the rigors of repeated cycling. In this regard nickel electrodes, for example, will contain PTFE in amounts of about 6% to about 18% by weight of the dried filter cake, with about 7%–8% being preferred. Zinc electrodes on the other hand require no more than about 8% by weight PTFE for successful binding with only about 3%–4% by weight being preferred.

The filter cake is then integrated with an appropriate current collector, and this may be accomplished in a variety of ways. In one such way, the current collector is positioned in the mold and the slurry poured over the collector such that the filter cake builds up on and around the collector. A preferred technique involves preparing two separate filter cakes or layers, sandwiching the current collector between the two layers and then proceeding to the compression and drying steps.

The current collector is essentially a macro-porous metal network extending substantially throughout the planar extent of the electrode for effectively gathering and conducting current to a site for its removal from the electrode. Acceptable current collectors include metal screen, expanded metal, metal foam, etc. Regardless of how the current collector and filter cake are integrated, the composite thereof is compressed which squeezes out much of the remaining water, enhances the electrical contact between and among the active material particles and the current collector and mechanically keys/interlocks the irregularly-shaped, coated clots together to form a strong coherent mass. The wet pressing of nickel electrodes is performed at pressures of about 9 MPa to about 31 MPa. Following compression, the electrode is dried in an oven at about 65° C.–100° C. for about five to fifteen minutes and again pressed at about the same pressures to ensure uniform thickness of the electrode.

Conductive diluents may be added to those electrodes whose active materials are not inherently conductive (e.g., $Ni(OH)_2$). Graphite is typically used for this purpose, but other materials, e.g. silicon carbide, nickel, etc. might also be used depending on the particular type of electrode being made. Graphite is preferred since it is inert to the cell environment, lightweight, conductive, inexpensive and is readily available in both powdered and fiber form. The total graphite content of a nickel electrode, for example, advantageously comprises up to about 30% by weight of the dry filter cake with about 23%–30% being preferred. The graphite therein is preferably in both the powdered and fibrous form (i.e. about 0.5 mm long), there being about half again as much powdered graphite (i.e. by weight) as there is fibrous graphite, though this can vary considerably. Graphite particles greater than about 5 microns in diameter appear to have relatively poor conductivity while particles less than about 0.5 microns in diameter seem to produce only short-lived electrodes. Particular success has been achieved in nickel electrodes using airspun graphite having an average particle size of about 2.5 microns and which is commercially available under the name of Dixon KS-2. Preferably, the nickel hydroxide (i.e. normally less than about 200 mesh) and powdered graphite are intimately mixed, as by dry ball-milling, to smear the graphite over the surface of the nickel hydroxide powder and thereby effect intimate contact therebetween. When graphite fibers are used they need not be premixed with the nickel hydroxide, but rather can be added separately to the slurry in the blender. In the case of nickel electrodes using ball-milled graphite-nickel hydroxide mixes, short blending times (i.e. less than about sixty seconds) are preferred because excessive blending (e.g. such as employed by McBreen) tends to wipe the graphite off the nickel hydroxide and reduce its effectiveness.

Accelerated filtration aided by vacuum or centrifugal force speeds up the process. It is preferred to use conventional paper-making techniques wherein the water is removed by drawing it off with a vacuum through an appropriate filter medium such as filter paper. Newsprint has proven quite acceptable for this purpose. The newsprint is positioned on a vacuum table, and a frame-like mold placed atop the paper. The mold cavity receives and contains the slurry from the blender while the water is drawn off through the filter paper.

By way of example, nickel electrode stock material is prepared which, excluding the current collector, comprises 62.1 percent by weight hydrated nickel hydroxide (Ni(OH)$_2$), 3.5 percent by weight cobalt hydroxide, 16.4 percent by weight graphite particles (2.5 micron), 10.5% by weight graphite fibers (i.e. Thornel grade VMA-Union Carbide), and 7.5% by weight PTFE. Green nickel hydrate (Ni(OH)$_2$) and cobalt hydrate (C$_o$(OH)$_2$) powders (i.e., less than 200 mesh) are dry ball-milled for four hours along with the powdered graphite particles. In a separate operation two milliliters of TEFLON 30B TFE Fluorocarbon dispersion are drawn into a hypodermic syringe and one milliliter of isopropyl alcohol added thereto in the syringe to coagulate the PTFE particles into a gelatinous coagulum. One half of this coagulum is then injected from the syringe into 150 ml of water which is being rapidly stirred in a Waring blender. The blender action breaks up the coagulum into small clots of PTFE particles and suspends them in the water. 9.4 grams of the Ni(OH)$_2$-graphite-C$_o$(OH)$_2$ mix and 1.2 grams of graphite fibers are then added to the suspension in the blender and blending continued for one (1) minute. The blender is stopped and the slurry therein quickly poured onto a sheet of newsprint on a vacuum table. A mold on top of the newsprint confines the slurry to a 12 cm $\times$ 12 cm $\times$ 2 cm mold cavity. A vacuum of about 25 in. Hg draws off the water in about thirty seconds and leaves the solids as a filter cake in the cavity. A second batch is made up the same way to form a second filter cake identical to the first. A 5 mil thick expanded nickel screen (i.e., 20 mesh) is then sandwiched between the two filter cakes and the sandwich compressed at about 73 Kg/Cm$_2$ followed by drying for three minutes at 100° C. A second pressing at the same pressure finishes the electrodes stock material to a thickness of about 0.104 cm.

Electrodes so made were tested. In one test electrodes (i.e., 47.6 mm $\times$ 79.4 mm) were cut from the stock material to have a theoretical capacity of 1.16 A.h, wrapped in non-woven polyamide felt and heat sealed around the edges. The felt had a thickness of about 0.010 cm and was supplied by the Pellon Corp. as their material 2504K4. Each electrode was assembled into cells between two like-sized inert sintered Ni placque electrodes heat sealed in polyamide felt the same as the test electrodes. A room temperature electrolyte comprising 37.5% by st KOH and 12 g/e L.OH was used and the electrodes formed with three charge-discharge cycles which included twenty hours charge at a current density of about 1.3 mA/Cm$^2$ and discharged at about 4.4 mA/Cm$^2$. In the third cycle, the active material utilization was tested by discharging the electrodes from an initial 1.73 volts to a cut off voltage of 1.0 volt as measured against a zinc reference electrode. These electrodes displayed a nickel hydrate utilization of about 0.30–0.31 A.h/g or about 106% of theoretical capacity and about 5.91–5.93 g/A.b of total electrode weight (i.e., including collector, graphite and PTFE).

In another test, electrodes (i.e., 38.1 mm $\times$ 57.2 mm) were cut from the stock material to have a theoretical capacity of about 0.67 A.h. These electrodes were heat-sealed as before in polyamide felt and assembled into cells between two sintered nickel oxide electrodes each of which was wrapped in a single "U"-fold of radiation-grafted polyethylene supplied by Radiation Applications Inc. as their material 2291. The same electrolyte was used and the electrodes formed with two cycles each comprising charging for 16 hours at about 2mA/Cm$^2$ and discharging at 0.335 amperes to $-0.85$ volts/cell (i.e., equivalent to 1.0 V as against a Zn reference). The cells were connected to a regulated, filtered DC supply and constant current cycled as follows: charge for 6 hours at about 2.8 mA/Cm$^2$; and discharge at about 7.7 mA/Cm$^2$ to a cut off voltage of $-0.85$ volts. This cycle was repeated until the electrode's capacity fell to about 75% of theoretical. One electrode so tested survived 167 such cycles while another electrode remained at 93% of its theoretical capacity after 278 cycles.

while this invention has been disclosed primarily in terms of specific embodiments thereof, it is not intended to be limited thereto but rather only to the extent set forth hereinafter in the claims which follow.

The embodiments of the invention in which an exclusive property or privilege is claimed are defined as follows:

1. In the process of making alkaline battery electrodes of the non-sintered, polymer-bound type including the principal steps of slurrying comminuted electrode active material and coagulated binder in a suitable suspension medium, filtering the slurry to remove said active material and binder from said medium as a filter cake, integrating said filter cake with a conductive current collector, compressing the current collector and cake, and drying the thusly formed compress, the improvement comprising: mixing a coagulant with an aqueous dispersion of fine polytetrafluoroethylene particles to form a coagulum of said particles; mechanically dispersing said coagulum in water such as to subdivide said coagulum into small irregularly shaped, sticky clots of said particles and suspend them in the water; and mixing the thusly formed aqueous suspension with said active material to form said slurry, whereby said clots become coated with said active material during said slurrying, and said coated clots interlock together during said compressing for forming a coherent mass thereof.

2. A process for making non-sintered, polytetrafluoroethylene-bound nickel electrodes for alkaline storage batteries comprising the steps of: mixing a coagulant with an aqueous dispersion of polytetrafluoroethylene particles to form a coagulum of said particles; mechanically stirring said coagulum in water such as to disperse and suspend said coagulum therein as small irregularly-shaped, sticky clots of said particles; slurrying the thusly formed suspension together with comminuted nickel hydroxide and graphite such that said nickel hydroxide and graphite adhere as a coating to the surface of said clots; filtering the coated clots from the slurry and forming a filter cake therefrom; integrating a conductive current collector with said filter cake; compressing said cake and current collector to densify the cake, to enhance the electrical conductivity within the compress and to interlock the coated clots one with the other into a coherent mass; and drying the thusly formed compress.

* * * * *

UNITED STATES PATENT AND TRADEMARK OFFICE
CERTIFICATE OF CORRECTION

PATENT NO. : 4,177,157
DATED : December 4, 1979
INVENTOR(S) : Richard L. Adams

It is certified that error appears in the above-identified patent and that said Letters Patent are hereby corrected as shown below:

Column 5, line 37, "A.h" should read -- A·h --.

Column 5, line 45, "st" should read -- wt. --.

Column 5, line 45, "g/e L.OH" should read -- g/l LiOH --.

Column 5, line 54, "A.h/g" should read -- A·h/g --.

Column 5, line 55, "g/A.b" should read -- g/A·h --.

Column 5, line 59, "A.h" should read -- A·h --.

Signed and Sealed this

Seventeenth Day of March 1981

[SEAL]

Attest:

RENE D. TEGTMEYER

Attesting Officer      Acting Commissioner of Patents and Trademarks